(No Model.)

H. BOLTHOFF.
REGISTER VALVE.

No. 533,388. Patented Jan. 29, 1895.

WITNESSES:

INVENTOR
H. BOLTHOFF.
BY
ATTORNEY

UNITED STATES PATENT OFFICE.

HENRY BOLTHOFF, OF DENVER, COLORADO.

REGISTER-VALVE.

SPECIFICATION forming part of Letters Patent No. 533,388, dated January 29, 1895.

Application filed June 25, 1894. Serial No. 515,646. (No model.)

*To all whom it may concern:*

Be it known that I, HENRY BOLTHOFF, a citizen of the United States of America, residing at Denver, in the county of Arapahoe and State of Colorado, have invented certain new and useful Improvements in Register-Valves; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in register valves well adapted for use in connection with machines operated by steam, but which may be employed in many other relations. For the purposes of this specification it may be considered a throttle valve, but it must be understood that this function is typical and exclusive.

My improved valve consists of the features, arrangements and combinations hereinafter described and claimed, all of which will be fully understood by reference to the accompanying drawings, in which is illustrated an embodiment thereof.

Figure 1:
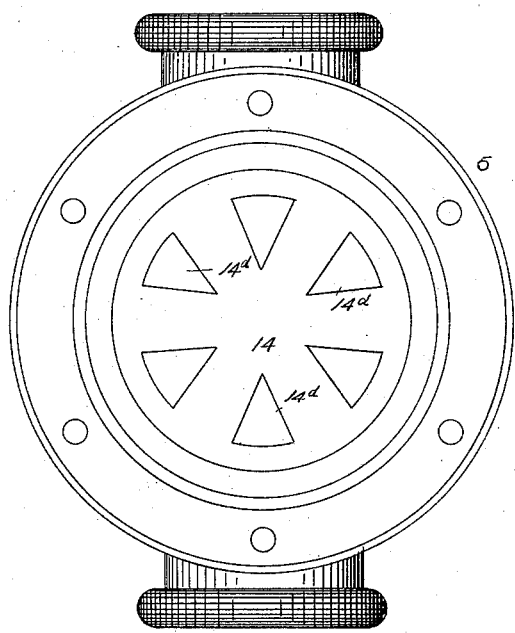
Figure 2:
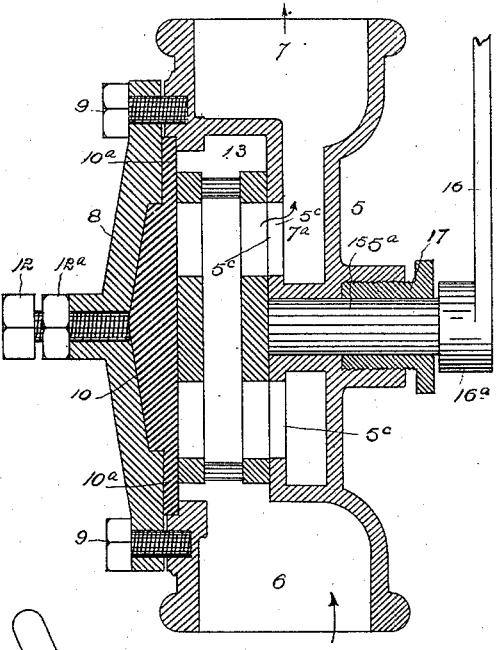
Figure 3:
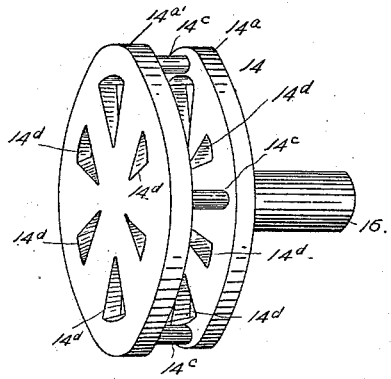
Figure 4:
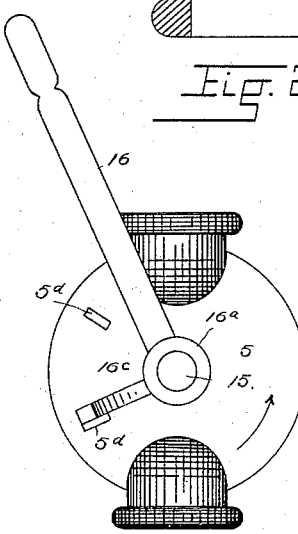

In the drawings, Figure 1 is an elevation of the valve with the detachable face plate and the compression disk removed. Fig. 2 is a section taken through the center of the valve, and cutting the inlet and outlet openings of the casing. Fig. 3 is a perspective view in detail of the valve proper. Fig. 4 is an elevation of the valve on a smaller scale.

Similar reference characters indicating corresponding parts in these views, let the numeral 5 designate the casing provided with the inlet and outlet openings 6 and 7, respectively. To this casing is attached a plate 8 by means of screw bolts 9; while between the plate and the casing is located the compression disk 10 whose outer edge engages a narrow shoulder formed on the casing, and fits in a circumferential recess. The disk 10 is controlled by a screw bolt 12 engaging a threaded aperture formed in the center of the plate 8. The inner extremity of this bolt engages the center of the disk. The disk has a thick central portion and a thin outer part $10^a$, a part of which engages a shoulder on the casing. This part $10^a$ of the metal disk has sufficient resiliency to permit the adjustment of the disk to compensate for the wear of the valve. This adjustment is accomplished by forcing the screw bolt 12 against the thick central portion of the disk, causing the thin outer part $10^a$ to spring or yield sufficiently to subserve the function stated. The compression disk closes the chamber 13 on the inside. In this chamber is located the balance valve 14 composed of two disks $14^a$ and $14^{a\prime}$ suitably separated and provided with connections $14^c$. The two valve parts are provided with apertures $14^d$ which coincide as to position. This valve is provided with a stem 15 which passes through an aperture formed in the casing. To the outer extremity of this stem is attached a controlling arm 16.

The casing is provided with a collar $5^a$ which is interiorly threaded to receive an exteriorly threaded gland 17 provided with a shoulder located between the collar $16^a$ of the arm 16 and the collar $5^a$ of the casing. This gland is adapted to take up the space between these collars and maintain the valve in operative relation.

The casing 5 is provided with apertures $5^c$ leading from the valve chamber to a space $7^a$ communicating with the outlet 7. The apertures $14^d$ of the valve disk $14^a$ are of the same size as the ports $5^c$. The apertures $14^d$ and $5^c$ are therefore adapted to register when the valve is properly adjusted. The apertures $14^d$ in the disk $14^{a\prime}$ are of the same size as the corresponding apertures in the disk $14^a$. Hence, the surface exposed to contact with the steam is the same in both disks $14^a$ and $14^{a\prime}$, making a perfectly balanced valve.

The collar $16^a$ of the arm 16 is provided with a projection $16^c$ adapted to engage lugs $5^d$ on the casing. These lugs form stops which limit the movement of the arm 16 in both directions. When the projection engages one stop lug, the valve is wide open, and when it engages the other, the valve is closed.

From the foregoing description, the operation of the valve will be readily understood. The valve 14 is opened through the instrumentality of the arm 16, the valve being turned so that the apertures $14^d$ register with the apertures $5^c$ of the casing. The steam then enters through the port 6, passes thence to the chamber 13, out through the apertures 14$^d$ in the disk 14$^a$ and the apertures 5$^c$ of the casing into the space 7$^a$, and thence out through the port 7. As the valve becomes worn, the screw bolt 12 is turned so as to compress the disk 10 whose outer portion 10$^a$ springs sufficiently to allow the disk to come in contact with the valve, thus compensating for the wear within reasonable limits. As the wear on this valve is very little, the scope of adjustment allowed by the spring part 10$^a$, of the compression disk is sufficient for all practical purposes. The bolt 12 is provided with a suitable lock nut 12$^a$.

Having thus described my invention, what I claim is—

1. In a valve, the combination of the casing having the inlet and outlet ports, the detachable face plate, the intermediate compression disk engaging a narrow shoulder formed on the casing and having a thin portion adjacent said shoulder and surrounding a thicker central part, a balance valve located in the valve chamber which is inclosed by the compression disk on one side, and the casing on the other side, the valve and casing being provided with ports adapted to register, and means for adjusting the compression disk from the outside of the casing, substantially as described.

2. The combination with the casing inclosing a suitable valve chamber having inlet and outlet ports of the register balance valve composed of two disks suitably separated and provided with co-inciding apertures, the apertures of one disk being equal, or approximately equal, in area to the corresponding apertures of the other disk, the end of the casing adjacent one disk being closed while that adjacent the other disk is provided with escape apertures, substantially as described.

3. The combination with the casing inclosing a valve chamber, and having a suitable valve located therein, of the compression disk engaging the valve and having an outer resilient part, a face plate covering the disk and secured to the casing, and suitable means passing through the plate and engaging the disk whereby the latter may be adjusted from the outside of the casing, substantially as described.

4. The combination with the casing inclosing the valve chamber and having the inlet and outlet ports, the balance valve located in said casing and composed of the disks, separated, suitably connected and provided with corresponding apertures equal, or approximately equal, in area and adapted to register with the outlet ports leading from the valve chamber, the compression disk bearing on the casing and engaging the valve, said disk having a rigid central part and a resilient outer part, a face plate attached to the casing and covering the disk, and means attached to said plate for adjusting the disk from the outside of the casing, substantially as described.

5. In a register valve, the combination with the casing and valve mechanism, of the disk bearing against the casing and engaging the valve, said disk having a resilient outer part and a rigid central part, and means for adjusting the disk from the outside of the casing, substantially as described.

In testimony whereof I affix my signature in the presence of two witnesses.

HENRY BOLTHOFF.

Witnesses:
CHAS. E. DAWSON,
G. J. ROLLANDET.